3,480,888

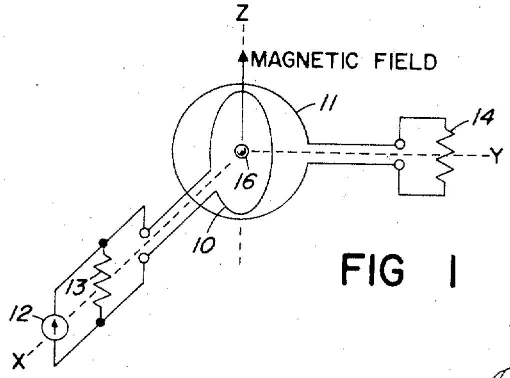
FIG 1
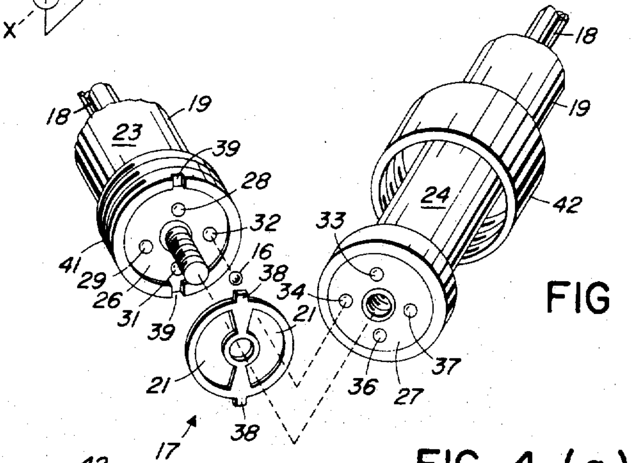
FIG 2
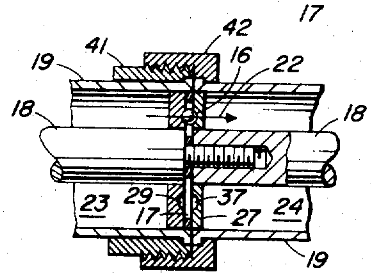
FIG 3
FIG 4 (a) (b)
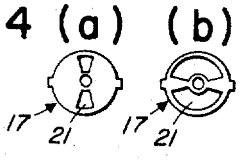
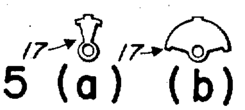
FIG 5 (a) (b)
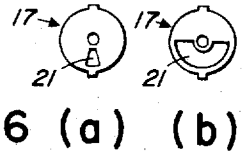
FIG 6 (a) (b)
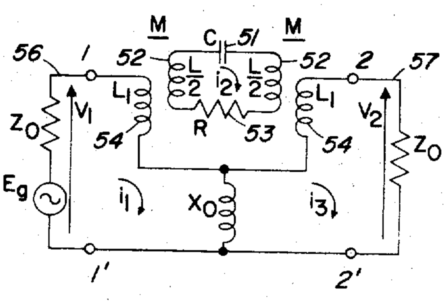
FIG 7
INVENTOR.
WILLIAM S. ELLIOTT
BY Moody & Hallacher
ATTORNEYS INVENTOR.
WILLIAM S. ELLIOTT
BY Moody & Gallacher
ATTORNEYS United States Patent Office 3,480,888 Patented Nov. 25, 1969

ELECTRONICALLY TUNED FILTER

William S. Elliott, Cedar Rapids, Iowa, assignor to Collins Radio Company, Cedar Rapids, Iowa, a corporation of Iowa Filed Mar. 3, 1966, Ser. No. 531,529
Int. Cl. H03h 7/10
U.S. Cl. 333—73 3 Claims

ABSTRACT OF THE DISCLOSURE

In many of the most modern systems concepts in the microwave field it is desirable to use narrow-band filters capable of rapid tuning or sweeping over frequency ranges of an octave or greater. Narrow-band filters consisting of quarter or half-wavelength coaxial lines, cavities, etc. are seriously limited in these applications by the accuracy and speed of mechanical tuning. Ferrimagnetic resonators as disclosed hereinafter are of importance because they can be used in the construction of electronically tunable filters whose pass band center frequencies can be varied simply by changing the strength of a biasing D-C magnetic field. The unloaded Q of these resonators at microwave frequencies compares favorably with the Q's of transmission line and hollow cavity resonators.

The resonance frequency of the filter herein described can be varied electronically by changing a D-C magnetic bias applied to the resonator. The frequency discriminator characteristic therefore can be swept, or tuned, across a range of frequencies with relative ease without the need for mechanical tuning means.

The invention is therefore directed to an electrically tunable filter which utilizes the magnetic properties of YIG resonators in conjunction with the coupling characteristics of an iris placed in the path of electromagnetic waves to control the center frequency of the band of frequencies passed by the filter simply by changing the strength of a D-C magnetic field which biases the filter.

This invention relates generally to electrronically tuned filters and particularly to electronically tuned filters utilizing the ferrimagnetic properties of a crystalline material commonly known as yttrium-iron-garnet (YIG).

In many of the most modern systems concepts in the microwave field it is desirable to use narrow-band filters capable of rapid tuning or sweeping over frequency ranges of an octave or greater. Narrow-band filters consisting of quarter or half-wavelength coaxial lines, cavities, etc., are seriously limited in these applications by the accuracy and speed of mechanical tuning. Ferrimagnetic resonators as disclosed hereinafter are of importance because they can be used in the construction of electronically tunable filters whose pass band center frequencies can be varied simply by changing the strength of a biasing D-C magnetic field. The unloaded Q of these resonators at microwave frequencies compares favorably with the Q's of transmission line and hollow cavity resonators.

It is therefore an object of this invention to provide an electronically tuned filter in which the center frequency can be varied over a wide range of frequencies.

Another object is to provide such a filter in which the band pass is essentially independent of frequency.

Another object is to provide such a filter having a widely variable center frequency which is tunable by changing the strength of a biasing D-C magnetic field.

Another object is to provide such a filter which utilizes the magnetic properties of YIG resonators and similar materials having ferrimagnetic properties.

Although the invention as described is directed primarily to a tuned filter the principles set forth herein are also applicable to such electronic devices as power limiters, and isolators without deviating from the scope of the invention as it is understood by one skilled in the art. The device as described hereinbelow also displays a discriminator characteristic which is applicable to feedback-type frequency control systems. It is also applicable to frequency detection of microwave frequency modulated signals. Frequency discriminators for these applications are commercially available but they utilize two resonators tuned to slightly different frequencies and have a number of practical problems. The structure as disclosed permits frequency discriminators for control purposes to be constructed using only one resonator.

The magnetic resonance frequency of the invention can be varied electronically by changing a D-C magnetic bias applied to the resonator. The frequency discrimator characteristic therefore can be swept, or tuned, across a range of frequencies with relative ease without the need for mechanical tuning means.

It is therefore the ultimate object of this invention to describe an electrically tunable filter which utilizes the magnetic properties of YIG resonators in conjunction with the coupling characteristics of an iris placed in the path of electronmagnetic waves to control the center frequency of the band of frequencies passed by the filter simply by changing the strength of a D-C magnetic field which biases the filter.

Further objects, features, and advantages of the invention will become apparent from the following description and claims when read in view of the accompanying drawings like numbers indicate like parts and in which:

FIGURE 1 shows the use of a ferrimagnetic resonator in a two-coil system which is useful in explaining the theory of this invention;

FIGURE 2 is a pictorial representation of the invention which shows the simplicity of the invention;

FIGURE 3 is a sectional view of the invention and is useful in fully understanding the construction thereof;

FIGURES 4, 5 and 6 show various iris configurations;

FIGURE 7 shows an electrical equivalent circuit of the invention; and

Figure 8:
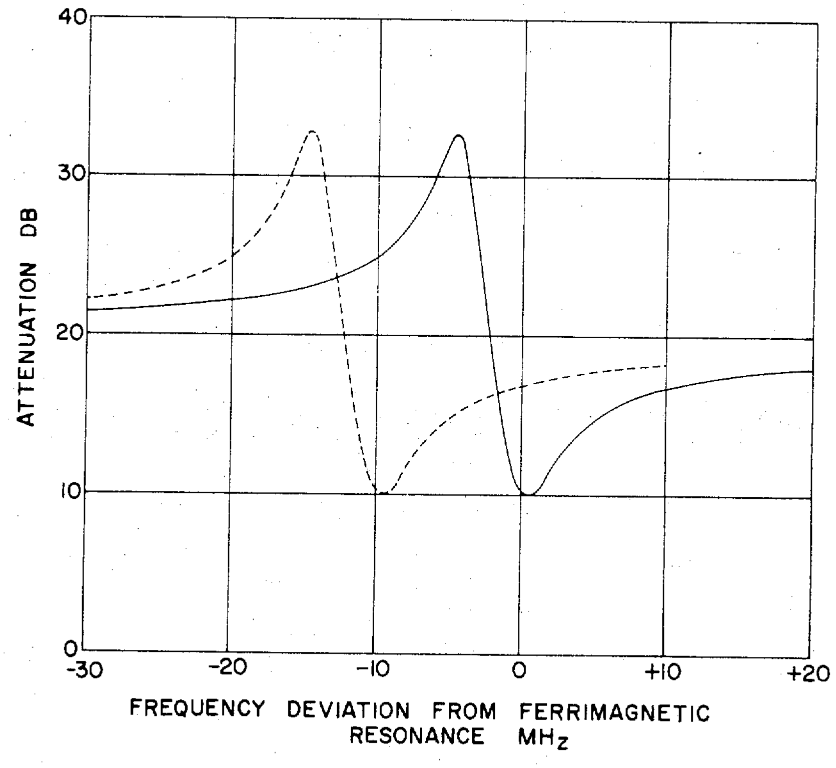
FIGURE 8 is a graph showing the discriminator characteristic of the invention.

Ferrite materials possess magnetic properties which are classified as ferrimagnetic, but the crystal structure of yttrium-iron-garnet (YIG) has been found to also exhibit ferrimagnetic properties. To use these ferrimagnetic properties in practice, a small ferrite sample of arbitrary configuration (usually a sphere) is located at the intersection of two coils (or microwave transmission line structures) which are placed perpendicular to each other to minimize mutual coupling between the two coils. FIGURE 1 illustrates the two coil configuration. Two coils 10 and 11 are arranged in a perpendicular relationship along the X and Y axes. A ferrimagnetic resonator, such as a YIG resonator, is placed at the intersection of the X, Y, and Z axes. When no D-C magnetic bias field is present there is no interaction between coil 10 and 11 and the ferrite sphere 16. However, when a magnetic field is applied along the Z-axis, the sphere becomes magnetized and has a net magnetic moment parallel to the Z-axis. An R-F driving current applied to one coil (11 as shown) causes the magnetic moment vector of the sphere precess about Z-axis and induce a voltage in the second coil. The induced voltage is largest when the signal frequency is at the ferrimagnetic resonance frequency of the ferrite sphere. The magnitude of response at ferrimagnetic resonance is determined by the degree of coupling and the internal losses of the ferrite. The ferrimagnetic resonance frequency depends upon the net magnetization of the material, the shape of the ferrite material and the intensity of the applied D-C magnetic bias field. For a sphere, the ferrimagnetic resonance frequency is approximately 2.8 gigahertz (gHz.) for a magnetic field strength of 1000 oersted. However, the resonance frequency varies according to the strength of the magnetic biasing field; therefore, by varying the strength of the magnetic biasing field, tuning can be accomplished. The frequency range is limited primarily by the bandwidth of the coupling configuration.

The coupling principle of FIGURE 1 has been applied to coaxial, stripline or waveguide structures. The characteristic of the filters constructed in this manner is a band pass response. Therefore, the magnetic resonator biased with a magnetic field is considered to be equivalent to a lumped-parameter resonant circuit.

Ferrimagnetic resonators can also be used to construct band reject filters by merely locating the resonator in the magnetic field of a transmission line. At the ferrimagnetic resonance frequency the resonator absorbs energy and produces the band reject characteristic.

In previous band pass applications the transmission structures include coaxial stripline and waveguide configurations. These structures have been constructed with the YIG resonator located at a point of high magnetic field intensity. The input and output lines are electromagnetically coupled to the YIG resonator but are not coupled to each other in the absence of the YIG resonator. This is similar to the simple example shown in FIG. 1. The instant invention differs from these structures by the addition of an iris in the transmission line which permits a controlled amount of electromagnetic coupling between the fields of the input and output lines in addition to the YIG coupling.

In addition to yttrium-iron other materials having ferrimagnetic properties also exist. The invention therefore contempletes the use of gallium-substituted yttrium-iron-garnet (Ga-YIG), lithium ferrite and barium ferrite as the resonators. It has also been suggested by Harrison and Hodges in "Microwave Properties of Polycrystalline Hybrid Garnets," Microwave Journal, volume 4, pages 53–59, 1961, that approximately one-half of the metal ions in the periodic chart have been put into the crystal structure of garnets. However, only a few of these exhibit ferrimagnetic properties above room temperature, and their use would therefore be limited. In general, it can be stated that materials containing in part one of the rare earth metals having an atomic number between 62 and 71 inclusive and also containing in part either yttrium, gallium, lithium, barium, scandium, indium, aluminum, or chromium exhibit sufficient ferrimagnetic properties to be useful in this invention. The materials also usually contain oxygen in addition to combinations of these substances.

In the band pass applications, the mutual coupling between the input and output transmission lines has been minimized. For the band reject applications there has been total coupling. The structure herein described considers mutual coupling between these two extremes; i.e., there is both mutual and resonator coupling between the input and output transmission lines. The structure that accomplishes this purpose is illustrated in FIGURE 2. Although the description is confined to a coaxial configuration, the principle is applicable to stripline, wave guide and other transmission structures. In the inventive device the mutual coupling between the input and output lines is implemented and controlled by etching various sized apertures in the iris which electromagnetically "shorts" the coaxial line and establishes an initial or off-resonance attenuation. If the aperture is extremely large (no iris), the structure has no initial attenuation and is that of the band reject filter. If the aperture is very small and the resonator is placed at the center of the aperture, the structure has very high initial attenuation and is equvalent to the band pass filter. For all apertures producing an initial attenuation, a unique discriminator characteristic is obtained. The characteristic is symmetric about the initial attenuation when plotted on a decibel scale, as shown in FIGURE 8.

FIGURE 8 shows a plot of frequency in megahertz (mHz.) versus attenuation in db. The zero frequency point is the resonant frequency of the YIG resonator, so that the plus and minus frequencies are the deviations above and below the resonant frequency. The shape of the curve around the resonant frequency is determined by the properties of the YIG and the coupling iris, although the YIG has the dominant influence. As is evident from the dotted curve, the center or resonant frequency shifts as the strength of the biasing magnetic field is changed but the curve maintains essentially the same characteristics. The center frequency can be changed over large frequency ranges (an octave or more) without significantly changing the discriminator shape. The effects to be noted are the magnitudes of the minimum and maximum attenuation peaks of the curve. The major effect of the iris is demonstrated by the magnitude of attenuation at frequencies distant from the YIG resonant frequency. The iris, with a particular size aperture, results in a particular initial attenuation of the input signal. In the illustration of FIG. 8 there is 20 db. The curve is asymptotic to the 20 db line, so that the curve below the 20 db line is characteristic of a bandpass filter, while the portion above the line is characteristic of a band reject filter. The total curve resembles a discriminator curve except the attenuation is logarithmic. In the absence of the YIG the curve would be an essentially straight line along the 20 db attenuation line. The curve can be moved up and down along the attenuation axes by respectively decreasing and increasing the size of the aperture. It remains asymptotic to the aperture initial attenuation. The combined effects of the iris and YIG are now evident. The signal attenuation peaks can be chosen at particular db values by the size of the iris aperture, while the resonant frequency can be changed by varying the magnitude of the biasing field for the YIG. Therefore, a band pass, band reject or discriminator filter is achieved for a range of frequencies determined by the characteristics of the YIG; the band pass being essentialy constant for all frequencies, but the center frequency being variable simply by changing the biasing magnetic field.

FIGURE 2 illustrates the geometry and construction of the coaxial coupling structure. A thin conducting iris 17 perpendicular to the axis of the coaxial conduction contacts the inner 18 and outer 19 conductors and represents a discontinuity on the line. To permit coupling, an aperture 21, which may be of arbitrary shape, is placed in the iris 17. The area of this aperture determines the coupling between the input and output lines and can be controlled by varying the size of the aperture.

The purpose of the YIG resonator 16 is to provide another form of coupling between the input and output lines. To acomplish this, the resonator (sphere) is physically located in the plane of the aperture. An axial D-C magnetic bias for the ferrimagnetic resonator is obtained by placing a solenoidal electromagnet about the entire structure. This is represented by flux lines 22 as shown in FIGURE 3. Because any one of numerous electromagnets available in the art can be used, the exact structure used is not shown. Since the magentic field intensity of the solenoid is essentially uniform over its internal cross section, the field applied to the sphere is independent of its position relative to the cross section of the transmission line. The easy axis of magnetization of the sphere is aligned parallel to the D-C magnetic field.

Referring again to FIGURE 2, the coaxial conductor is shown disassembled into two portions 23 and 24. In portion 23 center conductor 18 is threaded at one end and is supported in the outer conductor 19 by a dielectric support 26. Center conductor 18 in portion 24 is bored and threaded to receive the threaded portion of center conductor 18. A second dielectric support 27 holds center conductor 18 in a coaxial position with the outer conductor 19. A series of holes 28, 29, 31, and 32 contained in dielectric support 26 are used to change the position of YIG 16 in the aperture 21 or iris 17. Dielectric support 27 contains a second arrangement of holes 33, 34, 36, and 37 which are positioned differently from the holes contained in dielectric 26 thereby creating an additional four positions for the resonator 16. Iris 17 is provided with a pair of nipples 38 which are received in slots 39 of sleeve 41. This permits the iris to maintain a constant position as the two portions of the coaxial conductor are fastened together. Sleeve 41 is threaded so it can be rigidly received by threaded sleeve 42 to thereby hold the two portions of the coaxial conductor together.

FIGURE 3 shows a cross-sectional view of the assembled coaxial conductor. As shown, the YIG resonator 16 is held in place by one of the holes contained in dielectric supports 26 and 27. Obviously the position of YIG resonator 16 in aperture 21 of iris 17 can be varied simply by placing YIG 16 in any of the eight various holes. The coupling characteristics of the iris itself can be varied by varying the size of apertures 21. FIGURES 4, 5, and 6 show various iris configurations which can be used to change the coupling characteristics. FIGURE 4A shows the iris having relatively small apertures 21 while FIGURE 4B shows relatively large apertures 21. A large number of similar irises can be obtained simply by increasing the size of aperture 21 from that shown in FIGURE 4A to a large aperture such as that shown in FIGURE 4B. FIGURE 5A shows a relatively small iris which electrically is substantially the same as having no iris in the coaxial line. The size of the iris portion is gradually increased until a fairly large iris is obtained as shown in FIGURE 5B. FIGURES 6A and 6B respectively show a relatively small aperture and an aperture which would be approximately 50% of the iris area. Here again the aperture area can be gradually increased from that shown in FIGURE 6A to the large one shown in FIGURE 6B to thereby vary the coupling characteristic of the iris.

An equivalent circuit representing the coaxial system with an iris discontinuity near ferrimagnetic resonance is shown in FIG. 7. The RCL circuit composed of capacitor 51, identical inductors 52 and resistor 53 represents the ferrimagnetic (YIG) resonator. The inductive reactance $X_0$ represents the iris discontinuity in the transmission line. Identical transformers 54 represent the symmetrical coupling of the YIG resonator to the input line 56 and output lines 57. The balanced representation of transformers 54 is based on having the ferrimagnetic resonator centered in the iris aperture along the axis of the line. The same circuit is applicable for an uncentered resonator except transformers 54 are not identical.

The circuit satisfies the two extremes of coupling for the physical device shown in FIGS. 1 and 2. In the absence of an iris discontinuity (the irises shown in FIGURES 4B and 5A approach this condition), $X_0$ is infinite and the circuit reduces to the equivalent circuit of a band reject filter. However, if the aperture is very small (FIGURES 4A to 6A approach this condition), $X_0$ is essentially zero and coupling can be accomplished only through the mutual inductance of the resonator circuit.

The equivalent voltage transmission coefficient is defined as:

$$T(j\omega)=\frac{V_2}{V_1}=\frac{Z_0 i_3}{E_g}$$

Solving the loop current equations this becomes:

$$T(j\omega)=\frac{2\{-\omega X_0 R/L+j[X_0(\omega_0{}^2-\omega^2)-\omega^3 M^2/L]\}}{(Z_0+j2X_0)[\omega_0{}^2-\omega^2+j\omega(R+2\omega^2 M^2/Z_0)/L]}$$

where $\omega$=angular frequency of energizing signal and
$\omega_0$=angular resonant frequency of the ferromagnetic resonator.

The transmission coefficient is therefore seen to depend upon both the magnetic coupling characteristics of the ferrimagnetic resonator and the inductive characteristic of the iris. The characteristics of the iris are a function of the iris aperture 21.

The invention as described above contains a single YIG resonator. However, the invention also contemplates the use of more than one such resonator. For example, the use of two resonators placed at diametric opposite positions in the iris can be quite advantageous. Assuming the two YIG's are identical the attenuation peaks of curve as shown in FIG. 8 will be altered in the immediate area of the resonant frequency analogous to two synchronously tuned circuits. If the two YIG's have slightly different resonant frequencies, the extremes of the curve will have a shape quite similar to that of a double-tuned circuit.

Although this invention has been described with respect to a particular embodiment thereof, it is not to be so limited as changes and modifications may be made therein which are within the spirit and scope of the invention as defined by the appended claims.

I claim:

1. An electronically tuned device comprising a conductor for conveying electromagnetic energy; said conductor being separable into two portions; means for assembling said two portions in substantially axial alignment; first coupling means including an iris having at least one aperture positioned between said two portions substantially normal to said substantially axial alignment and transversely to the flow of said electromagnetic energy, second coupling means including at least one ferrimagnetic resonator; support means for retaining said second coupling means in a proximate relationship to said first coupling means; and a magnetic field external to said conductor in the proximity of said second coupling means so that variations of said magnetic field result in variations of the coupling characteristic of said second coupling means, said first and second coupling means cooperatively functioning to provide a continuous frequency response characteristic for said tuned device including a band reject response, a band pass response, and a discriminator characteristic intermediate therebetween.

2. The device of claim 1 wherein said resonator coupling means is a spherical crystalline ferrimagnetic material.

3. The device of claim 2 wherein said ferrimagnetic material is a garnet containing a rare earth metal and a substance selected from the group consisting of yttrium, gallium, lithium, barium, scandium, indium, aluminum and chromium.

References Cited

UNITED STATES PATENTS

| | | | |
|---|---|---|---|
| 3,128,439 | 4/1964 | Brown | 333—24.2 |
| 3,368,169 | 2/1968 | Carter | 333—73 |
| 3,299,376 | 1/1967 | Blau | 333—24.2 |
| 3,290,625 | 12/1966 | Bartram et al. | 333—73 |
| 3,268,838 | 8/1966 | Matthei | 333—73 |
| 3,001,154 | 9/1961 | Reggia. | |
| 2,997,673 | 8/1961 | Whirry | 333—73 |
| 3,016,495 | 1/1962 | Tien | 330—56 |

OTHER REFERENCES

P. S. Carter: "Magnetically Tunable Filters, Etc.," I.E.E. Trans. on Microwave Theory, May 1965, pp. 307–315.

H. K. SAALBACH, Primary Examiner

C. BAROFF, Assistant Examiner

U.S. Cl. X.R.

330—4; 333—24.2, 83